(12) United States Patent
Gupta (10) Patent No.: US 11,397,942 B2
(45) Date of Patent: *Jul. 26, 2022

(54) ONLINE INTERACTION SECURITY TECHNOLOGY

(71) Applicant: Bank of America Corporation, Charlotte, NC (US)

(72) Inventor: Saurabh Gupta, New Delhi (IN)

(73) Assignee: Bank of America Corporation, Charlotte, NC (US)

(*) Notice: Subject to any disclaimer, the term of this patent is extended or adjusted under 35 U.S.C. 154(b) by 188 days.

This patent is subject to a terminal disclaimer.

(21) Appl. No.: 16/851,246

(22) Filed: Apr. 17, 2020

(65) Prior Publication Data

US 2021/0326841 A1    Oct. 21, 2021

(51) Int. Cl.
| | | |
|---|---|---|
| *G06Q 20/10* | (2012.01) | |
| *G06Q 20/34* | (2012.01) | |
| *G06Q 20/38* | (2012.01) | |
| *G06K 7/00* | (2006.01) | |

(52) U.S. Cl.
CPC ......... *G06Q 20/352* (2013.01); *G06K 7/0065* (2013.01); *G06Q 20/382* (2013.01)

(58) Field of Classification Search
CPC .......................... G06Q 20/352; G06Q 20/382
USPC ........................................................ 705/41
See application file for complete search history.

(56) References Cited

U.S. PATENT DOCUMENTS

| | | | | |
|---|---|---|---|---|
| 6,736,313 | B1* | 5/2004 | Dickson | G06Q 20/204 235/382 |
| 2007/0106897 | A1* | 5/2007 | Kulakowski | H04L 9/083 713/168 |
| 2011/0298585 | A1* | 12/2011 | Barry | G06F 21/32 704/E15.04 |

(Continued)

OTHER PUBLICATIONS

Authors: Motiwalla, L.F.; A Voice-Enabled E-Learning Service (VóIS) Platform; IEEE Conference Paper; Publication Date: Apr. 1, 2009; Conference Start Date: Apr. 20, 2009; Conference End Date: Apr. 25, 2009; (Year: 2009).*

(Continued)

*Primary Examiner* — Hani M Kazimi
*Assistant Examiner* — Hatem M Ali
(74) *Attorney, Agent, or Firm* — Weiss & Arons LLP (57) ABSTRACT

Typically, online transactions, such as online purchases of products or services require entering sensitive transaction information into a third-party web browser or application. This may expose sensitive transaction information to an increased risk of inadvertent disclosure. Apparatus and methods are provided for a smart card which enables users to securely complete online transactions without entering any sensitive transaction information into a third-party system. Vendor websites may be configured to generate a unique code identifying the vendor offering the product/service, the product/service and price of the product/service. The smart card includes a keypad for entering the unique code and completing payment for the desired product/service. The smart card will include a microprocessor and wireless interface. The wireless interface provides wireless communication capabilities and the ability to initiate online payments based on information captured by the keypad.

20 Claims, 6 Drawing Sheets

(56) References Cited

U.S. PATENT DOCUMENTS

2019/0286805 A1    9/2019  Law et al.

OTHER PUBLICATIONS

Authors: N. Rippen etal: Interactive Multitask Credit Card Technology; IEEE Conference Paper: Last Update Date: Jan. 22, 2008 ; Publication Date: May 1, 2007 (Year: 2007).*

Authors: Motiwalla, L.F.; A Voice-Enabled E-Learning Service (VoIIS) Platform; IEEE Conference Paper; Publication Date: Apr. 1, 2009; Conference Start Date: Apr. 20, 2009; Conference End Date: Apr. 25, 2009; (Year: 2009) (Year: 2009).*

Authors: N. Rippen et al: Interactive Multitask Credit Card Technology; IEEE Conference Paper: Last Update Date: Jan. 22, 2008 ; Publication Date: May 1, 2007 (Year: 2007) End Date: Apr. 25, 2009; (Year: 2009) (Year: 2009).*

* cited by examiner

ONLINE INTERACTION SECURITY TECHNOLOGY

BACKGROUND

Field of Technology

Aspects of the disclosure relate to improving efficiency and security of online transactions.

When conducing online transaction and payments, users typically enter credit card information or other sensitive transaction information into a web browser or mobile application. However, doing so increases a risk that the sensitive transaction information will be exposed. For example, security associated with the web browser may be substandard or the security of another network system utilized by a mobile application may be compromised. These potential security flaws associated with third-party systems that transmit and capture sensitive transaction information may increase the exposure risk.

In addition to security breaches of even reputable third-party systems, there are nefarious actors that design rogue systems which attempt induce users to enter sensitive transaction information into legitimate looking webpages. These rogue systems are typically designed to masquerade as a reputable system or webpage, and thereby induce the use to enter sensitive transaction information. The rogue system may then expose the captured sensitive transaction information for self-serving pecuniary gain.

Recently, use of digital wallets has proliferated. These digital wallets are typically associated with more reliable security than prior systems. However, even use of a digital wallet does not fully address the challenges in securing sensitive transaction information. For example, when using digital wallets, sensitive transaction information may still be captured using third-party applications who may track use and content of the sensitive transaction information. By increasing the number of parties that handle the sensitive transaction information, there is an associated increase in risk that the sensitive transaction information will be inadvertently disclosed.

It would be desirable to provide more secure apparatus and methods for users to make online payments, purchases or other transactions without providing sensitive transaction information to any third-party system. In addition to reducing the exposure risk of sensitive transaction information, such apparatus and methods may improve the user experience when making an online payment or purchase. Accordingly, it would be desirable to provide apparatus and methods for ONLINE INTERACTION SECURITY TECHNOLOGY.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Apparatus for a system that improves transmission security of sensitive transaction information for online interactions is provided. The system may include a smart card. A smart card may be a payment (e.g., debit or credit) card that includes embedded integrated circuitry. The integrated circuitry may be configured store sensitive transaction information. The integrated circuitry may also be configured execute machine readable instructions that control operation of other components of the smart card.

The smart card may include hardware and associated integrated circuitry for users to complete online transactions without entering sensitive transaction information into a third-party system such as a web browser or other software applications.

The smart card may include a keypad. The user may depress keys on the keypad to enter information directly into the smart card. The information may include a unique code generated by a vendor selling goods or services. The smart card may also include a microprocessor and a Network Interface Card ("NIC"). The microprocessor and associated NIC may enable the smart card to establish a communication channel. Over the secure communication channel, the smart card may interact directly with a secure system for completing a purchase. The secure system may be operated by an issuer of the smart card or an acquirer of the vendor.

The system may include specially designed vendor websites. Such vendor websites may offer goods or services for purchase. The specially designed vendor websites may be configured to generate a unique code for each product/service available for purchase from a vendor. Each unique code may include vendor, product and price information. The unique code may be displayed publicly by the vendor website.

A smart card user may enter the displayed unique code using the keypad of the smart card. By entering the unique code directly into the smart card itself, sensitive transaction information will not be entered into any third-party systems. As will be explained below, based on the information included in the unique code, a transaction for purchasing the product associated with the unique code will be initiated by the smart card with a known secure transaction gateway.

In addition to a microprocessor, the smart card may include various other hardware components. Such components may include a battery, a speaker, and antenna(s). The microprocessor may have a thickness that is not greater than 0.25 millimeters ("mm"). The microprocessor may control overall operation of the smart card and its associated components. The smart card may include RAM, ROM, an input/output ("I/O") module and a non-transitory or non-volatile memory.

The I/O module may include a microphone which may accept user provided input. The I/O module may include one or more of a speaker for providing audio output and a display for providing textual, audiovisual and/or graphical output.

Software may be stored within the non-transitory memory and/or other storage media. Software may provide instructions, that when executed by the microprocessor, enable the smart card to perform various functions. For example, software may include an operating system, application programs, web browser and a database. Alternatively, some or all of computer executable instructions of the smart card may be embodied in hardware or firmware components of the smart card.

Application programs, which may be used by the smart card, may include computer executable instructions for invoking user functionality related to communication, authentication services, and voice input and speech recognition applications. Application programs may utilize one or more algorithms that encrypt information, process received executable instructions, interact with an issuer or acquirer bank systems, perform power management routines or other suitable tasks.

The smart card may include a pressure sensitive button. The pressure sensitive button may have a thickness that is not greater than 0.8 mm. A user may actuate the pressure sensitive to power on or off one or more components of the smart card. For example, actuating the pressure sensitive button may activate the microprocessor, keypad or NIC of the smart card.

The smart card may operate in a networked environment. The smart card may support establishing communication channels with one or more issuer or acquirer bank systems. The smart card may connect to a local area network ("LAN"), a wide area network ("WAN") a cellular network or any suitable communication network. When used in a LAN networking environment, the smart card may be connected to the LAN through a network interface or adapter. The NIC may include the network interface or adapter.

When used in a WAN networking environment, the smart card may include a modem or other means for establishing communications over a WAN, such as the Internet. The NIC may include the modem. It will be appreciated that the existence of any of various well-known protocols such as TCP/IP, Ethernet, FTP, HTTP and the like is presumed.

The smart card may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The smart card may utilize computer-executable instructions, such as program modules, being executed by a computer. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

The smart card may include one or more batteries. A battery of the smart card may be flexible. The battery may be a power source for electronic hardware components of the smart card. For example, the battery may supply power to a keypad, NIC and the microprocessor. The battery may have a thickness that is not greater than 0.5 mm.

The smart card may include an electrical contact. The battery may be recharged via an electrical contact when the smart card is inserted into an Automated Teller Machine ("ATM"). An electrical contact may be constructed using any suitable material that conducts or transfers electricity. The smart card may include a plurality of electrical contacts. An electrical contact may be accessible on any suitable face of a housing of the smart card. The contact may be utilized to transfer electrical charge to the rechargeable battery when the smart card is inserted into a card reader of the ATM.

In some embodiments, the smart card's power source may include high frequency signals received from an ATM or other network node. The smart card may be configured to utilize received high frequency signals to recharge the battery or provide power to other hardware components of the smart card. The high frequency signals may conform to a standardized near field communication (NFC) communication standard.

Illustrative NFC protocols include European Computer Manufacturers Association Document Nos. 340 and 352 and International Organization for Standardization Document Nos. 18092 and 21481. All these standards are hereby incorporated by reference herein in their entireties.

The smart card may insulate sensitive transaction information stored on the smart card from exposure to unsecure systems. The smart card may include a housing. The smart card may include wireless interface embedded in the housing. The wireless interface may include a NIC. The microprocessor may be embedded within a thickness of the housing. The smart card may include a battery for powering the wireless interface and the microprocessor. The smart card may include a keypad. The keypad may be a mechanical keypad. The keypad may be mounted on an outside of the housing.

The smart card may include executable instructions stored in a non-transitory memory. The executable instructions, when run by the microprocessor may ingest non-sensitive data generated by an unsecure computer system. The non-sensitive data may include a unique code generated by the unsecure computer system. The executable instructions may formulate a set of sensitive transaction instructions based on the non-sensitive data. For example, non-sensitive data may include a unique code that includes vendor, product and price information associated with an item offered for sale by a vendor.

The formulated sensitive transaction instructions may incorporate sensitive transaction information stored on the smart card. Sensitive transaction information, as used herein, may include:
  Primary Account Number ("PAN")
  User name
  Address
  Telephone number
  Expiration date
  Service code
  Authentication data
  Personal Identification Number ("PIN")
  PIN Block
  Card validation value (CVV), or any other three/four-digit card security code The PAN is a typically multi-digit number printed on a front face of the smart card. The PAN may identify an issuer bank associated with the smart card. The smart card may correlate the specified issuer to the network address of a secure transaction gateway. The PAN may identify a user account at the issuer bank.

A PIN associated with the smart card may be a secret numeric password known only to the user of the smart card. The PIN may be used to authenticate the user before providing access to a secure transaction processing system. A user may only be granted access to the secure system if the provided matches a PIN stored on the secure system. For example, a PIN may be used to authenticate the smart card at an ATM. A PIN may also be used to authorize a digital signature implemented by an EMV chip.

A PIN Block includes data used to encapsulate a PIN during processing and transmission of the PIN. The PIN block defines the location of the PIN within the PIN block and how it can be extracted from the PIN block. A typical PIN block includes the PIN, the PIN length, and may contain subset of the PAN.

A service code may be a multidigit number. For example, in a three-digit service code, the first digit may indicate specific interchange rules that apply to the smart card. The second digit may specify authorization processing that is applied to the smart card when initiating a transaction. Illustrative authorization processing may include requiring submission of a PIN, biometric feature, signature or a combination thereof. The second digit may also identify a secure transaction gateway that is authorized to process transaction instruction formulated by the smart card.

The third digit may specify a range of services that are authorized in connection with use of the smart card. For example, the third digit may indicate whether the smart card may be used at an ATM to withdraw cash or only to purchase goods or service from a vendor.

Using a wireless interface, the smart card may establish a direct communication channel with a secure transaction gateway. A network address of the secure transaction gateway may be identified in the sensitive transaction instructions formulated by the microprocessor. The location of the secure transaction gateway may be determined based on identity of the vendor in the unique code.

For example, the microprocessor may identify the secure transaction gateway based on the vendor code in the unique code. A transaction interface on the smart card may resolve different vendor codes to different secure payment gateways. The transaction interface may resolve a first vendor code to a first secure transaction gateway. The wireless interface may communicate with the first secure transaction gateway using a first communication protocol. Communication with the first secure transaction gateway may be encrypted using a first encryption algorithm.

The transaction interface may resolve a second vendor code to a second secure transaction gateway. The wireless interface may communicate with the second secure transaction gateway using a second communication protocol. Communication with the second secure transaction gateway may be encrypted using a second encryption algorithm.

The smart card may transmit transaction instructions that include sensitive transaction information directly to the secure transaction gateway for processing. In some embodiments, the smart card may transmit the sensitive transaction information to the transaction gateway in a separate communication, distinct from transmission of transaction instructions. In some embodiments, the smart card may transmit the sensitive transaction information to a first transaction gateway and transmit the transaction instructions to a second transaction gateway. A secure transaction gateway may process the transaction instructions on behalf of the unsecure computer system, bypassing the unsecure computer system and thereby reducing an exposure risk of the sensitive transaction information.

The secure transaction gateway may be operated by an issuer or an acquirer bank. The secure transaction gateway may process a purchase transaction on behalf of a vendor. The secure transaction gateway may credit an account of the vendor for the purchase of a product by the user of the smart card. The secure transaction gateway may debit an account of the user of the smart card for the purchase of the product.

The identity and cost of a product may be determined based on the non-sensitive data. The non-sensitive data may include the unique code generated by the vendor. The unique code may include information such as a vendor code, a product code and a transaction amount.

The vendor may display the unique code via an unsecure third-party system such as a web browser or mobile application. The smart card may formulate transaction instructions based on the unique code. The smart card may encrypt the transaction instructions. Only the secure transaction gateway may be capable of decrypting the transaction instructions.

The smart card may receive confirmation from the secure transaction gateway that the transaction instructions have been successfully executed. For example, the secure transaction gateway may communicate to the smart card via the wireless interface that the transaction instructions generated by the smart card have been successfully executed.

The secure transaction gateway may provide the smart card with confirmation that desired product is being shipped to the user. In some embodiments, the user may be provided the option to enter shipping information using the keypad. The secure transaction gateway may trigger the smart card to prompt for the shipping information.

In some embodiments, the smart card may receive confirmation directly from a vendor computer system. For example, the non-sensitive data may include an internet protocol ("IP") address or other identifying characteristic of the third-party system (e.g., browser or other application) used to display the unique code. After successfully processing the transaction instructions, the secure transaction gateway may push a notification to the vendor system confirming successful execution of the transaction instructions.

The smart card may include a biometric reader. The microprocessor may require submission of a valid biometric feature before attempting to establish a communication channel with the secure transaction gateway. The microprocessor may require submission of a valid biometric feature before submitting the transaction instructions to the secure transaction gateway.

The housing and the keypad collectively may have a thickness that is not greater than 0.8 millimeters ("mm") and a surface area that is not greater than 86 mm×54 mm. Such a compact form factor may allow the smart card to be inserted into traditional card readers and function as a typical debit or credit card.

For example, the user may use the smart card to access an ATM and withdraw cash. The user may also use the smart card to make a purchase at a traditional brick and mortar vendor location. The user may pay for such a purchase using a conventional point-of-sale ("POS") terminal at the brick and mortar location. When the smart card is inserted into card reader of an ATM or POS terminal a battery of the smart card may be recharged.

A wireless interface of the smart card may include an inactive state. When in the inactive state, the wireless interface may be unable to connect to a communication channel or transmit data. The wireless interface may include an active state. In the active state, the wireless interface may be capable of connecting to a communication channel or transmitting data. The microprocessor may toggle the wireless interface from the inactive state to the active state. The microprocessor may toggle the wireless interface from the active state to the inactive state.

For example, the microprocessor may detect that a valid PIN has been entered by the user of the smart card using the keypad. In response to receiving the valid PIN, the microprocessor may toggle the wireless interface from the inactive to the active state. In response to receiving invalid PIN, the microprocessor may maintain the wireless interface in the inactive state. In some embodiments, if the microprocessor detects a threshold number of invalid PIN entries, the microprocessor may lock the wireless interface.

The microprocessor may require a special code to unlock the wireless interface. The microprocessor may require that the smart card establish a wired connection to unlock the wireless interface. For example, the wireless interface may only be unlocked when the smart card is inserted into a card reader of an ATM. The smart card may also require entry of a valid PIN to access the ATM before unlocking the wireless interface.

A system for securing transmission of sensitive transaction information during an online interaction is provided. The system may include a smart card that interacts with an unsecure component of a remote computer system. The smart card may have a thickness not greater than 0.8 millimeters (mm). The smart card may have a surface area not greater than 86 mm×54 mm.

The smart card may include a keypad. The keypad may be a mechanical keypad. The keypad may not expand the form factor of the smart card beyond 86 mm×54 mm×0.8 mm.

The smart card may include a wireless communication interface. The wireless communication interface may be configured to communicate using any suitable wireless communication protocol. Exemplary wireless communication protocols may include Wi-Fi, ZigBee, cellular and NFC.

The smart card may include a microprocessor. The microprocessor may be configured to control overall operation of the smart card and its associated components. The smart card may include executable instructions stored in a non-transitory memory. The executable instructions, when run by the microprocessor, may configure the microprocessor to take actions or control operation of one or more components of the smart card.

The executable instructions, when run by the microprocessor may formulate transaction instructions. The microprocessor may encrypt the transaction instructions. The microprocessor may formulate encrypted transaction instructions based on public data generated by the unsecure component of the remote computer system. The unsecure component may include a publicly accessible website and a unique code displayed by the website.

The unsecure component may include any system or components thereof that are not known as a secure system to the smart card. For example, the unsecure component may include a web browser for displaying information presented by the publicly accessible website.

The public data presented by the unsecure component may be viewed by a user of the smart card and entered by the user into the smart card using the keypad. The public data may include a unique code. The publicly accessible website may offer goods or services for purchase. A specially designed vendor website may be configured to generate a unique code for each product/service available for purchase on the vendor website.

The unique code may include vendor, product, shipping and/or price information. The unique code, displayed by the vendor website, may be entered into the smart card using the keypad of the smart card. By entering the unique code directly into the smart card itself, sensitive transaction information is not entered into the unsecure component, such as the web browser or any other third-party system.

The executable instructions, when run by the microprocessor may formulate encrypted transaction instructions based on the unique code entered by the user. The microprocessor may formulate the encrypted transaction instructions based on vendor, product, shipping and price information.

The microprocessor may activate a wireless interface of the smart card. The wireless interface may include a NIC. Using the wireless interface, the microprocessor may establish a communication link with a secure transaction gateway. A network address of the transaction gateway may be stored on the smart card. For example, the network address of a secure transaction gateway may be stored in firmware of the smart card's NIC.

In other embodiments, the smart card may include a transaction interface. The transaction interface may determine a network address of a secure transaction gateway for an entered unique code. The transaction interface may resolve different unique codes to different transaction gateways.

The transaction interface may determine an appropriate transaction gateway based on a vendor identified in the unique code. For example, different vendors may be associated with different acquirer banks. Each of the acquirer banks may utilize different security or communication protocols. The transaction interface may direct the smart card to a transaction gateway that is compatible with the security or communication protocols utilized by a particular acquirer bank.

The transaction interface may determine an appropriate transaction interface based on a cost of the product identified in the unique code. For example, a transaction gateway that requires higher level security and authentication may be utilized for higher value purchases.

The executable instructions, when run by the microprocessor, may authenticate the smart card to the transaction gateway over the secure communication channel. The microprocessor may transmit the encrypted transaction instructions to the transaction gateway. The transaction gateway may then process the transaction instructions received from the smart card.

Processing the transaction instructions may include debiting an account of the smart card user an amount corresponding to a purchase price of the product identified in the unique code. After debiting user account, the transaction gateway may provide confirmation to the smart card and to the vendor. Upon receipt of the confirmation from the transaction gateway, the vendor may ship the product identified in the unique code to the user of the smart card. The transaction gateway may provide the user's shipping information to the vendor.

By interacting with the transaction gateway, the system insulates sensitive information from being exposed to potentially unsecure third-party systems. The unique code is used to succinctly identify critical, yet non-secure information needed to process a transaction. The unique code is securely entered directly into the smart card. The smart card then securely communicates with a secure transaction gateway to process the transaction based on the information provided in the unique code.

Thus, necessary, yet non-secure information is efficiently captured from the non-secure third-party system and a transaction is processed without transferring any sensitive transaction information to the non-secure third-party system. The smart card serves as a secure intermediary, capturing non-secure information from a third-party system and securely passing sensitive transaction information to the secure transaction gateway, bypassing any interaction with the non-secure third-party system.

The smart card may include a voice controller. The voice controller may generate an audio message confirming a substance of the encrypted transaction instructions generated by the smart card. For example, the voice controller may generate an audible message that identifies a product that will be purchased and the amount that will be charged for the product.

The voice controller may generate this audible message before transaction instructions and any associated sensitive transaction information are transmitted to the secure transaction gateway. After the voice controller generates the audible message, the microprocessor may not transmit the encrypted transaction instructions to the transaction gateway until receiving authorization entered using the keypad. The authorization may be entered by pressing target keys on the keypad to confirm that the user of the smart card wishes to proceed with the transaction.

In some embodiments, the audio message may itself specify the target authorization keystrokes. Illustrative target authorization keystrokes may include pressing two or more keys concurrently or a specified sequence of keys.

The smart card may include a transaction interface. The transaction interface may be configured to determine a network address of a transaction gateway. The transaction interface may determine the network address of the transaction gateway based on the public data generated by the unsecure component of the remote computer system. For example, the network address of a transaction gateway may be determined based on the identity of the vendor or product. The network address of the transaction gateway may be determined based on the cost or price the product. The network address of the transaction gateway may be included in a unique code.

Public data generated by an unsecure system component may include a 10-digit unique code. A first three digits of the unique code may correspond to a vendor code. The vendor code may identify a vendor offering products or services for sale. The vendor code may identify the vendor that generated the unique code. A second three digits of the unique code may correspond to a product code identifying a product or service. The final four digits of the unique code may correspond to a cost associated with the product or service offered for sale by the vendor.

A unique code may be generated by an unsecure system component of the remote computer system. For example, the unique code maybe publicly displayed to any person or device interested in the product or service offered for sale by the vendor. The unique code may be displayed to a user using a web browser.

Methods for securing sensitive transaction information stored on a smart card are provided. Methods may include completing an online transaction without transmitting sensitive transaction information directly to a vendor selling a product or any other third-party computer system. A third-party system may be defined as any system that is not operated by an issuer of the smart card. Methods may include using a keypad of the smart card, entering public data generated by an unsecure system component of a vendor system. The public data may include a unique code generated and displayed by the vendor.

Methods may include generating transaction instructions. The transaction instructions may integrate sensitive transaction information stored locally on the smart card and public data provided by the vendor. Based on the public data, methods may include determining a network address of a secure transaction gateway. Using a wireless interface of the smart card, methods may include establishing a secure communication channel with the secure transaction gateway.

Methods may include transferring the transaction instructions to the secure transaction gateway using the secure communication channel. The secure transaction gateway may provide a secure interface, operated by an issuer of the smart card, for insulating the sensitive transaction information stored on the smart card from direct interaction with the vendor system. Because the sensitive transaction information is transmitted directly to the secure transaction gateway, the sensitive transaction information is not exposed to any vendor or other third party-systems.

In some embodiments, the smart card may include a transaction interface. The transaction interface may be configured to resolve data included in the public data to a known secure vendor system. The transaction interface may determine whether the vendor system is a system that meeting security requirements set by the issuer of the smart card. The secure vendor system may securely process the transaction instructions formulated by the smart card.

In some embodiments, before connecting to the secure vendor system, the smart card may obtain approval for communicating with the secure vendor system from an issuer bank. The smart card may use the wireless interface to request and receive approval to communicate with the secure vendor system from the issuer.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

Figure 1:
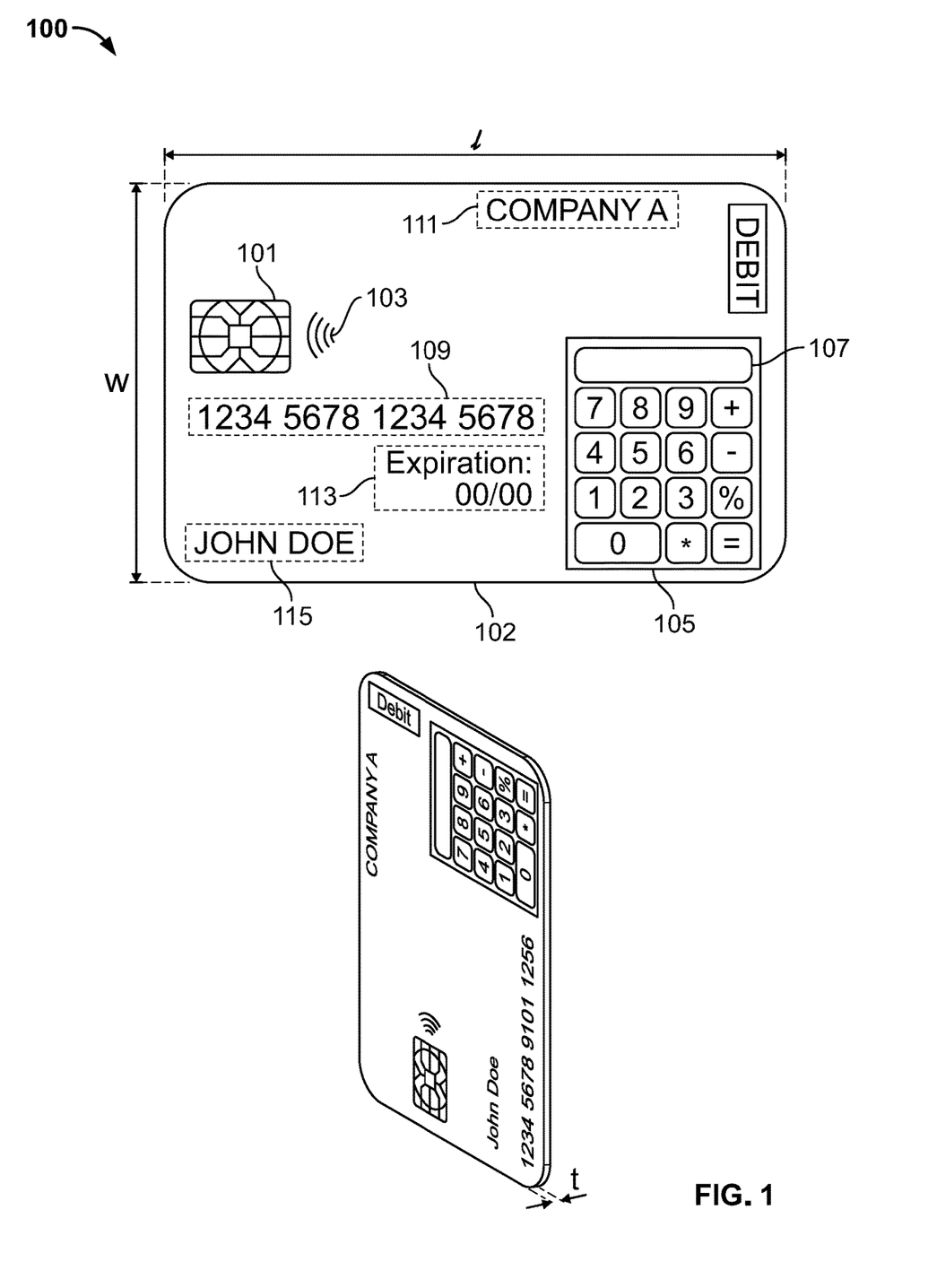
FIG. 1 shows illustrative apparatus in accordance with principles of the disclosure.

FIG. 1 shows illustrative smart card 100. Smart card 100 includes keypad 105. Keypad 105 may be used by a user of smart card 100 to enter information. Exemplary information may include a unique code presented by a vendor website.

Smart card 100 includes a microprocessor and other components for capturing, encrypting and storing information entered by a user. Smart card 100 may also include executable instructions for packaging information entered via keypad 105 into transaction instructions that may be executed by a secure transaction gateway. The executable instructions may also formulate the transaction instructions based on sensitive transaction information stored on the smart card.

FIG. 1 shows that smart card 100 includes chip 101. Chip 101 may provide an electrical contact that is accessible through housing 102. Chip 101 may provide an electrical contact for establishing a wired or contact based communication channel with an ATM or POS terminal when card 100 is inserted into a card reader of the ATM or POS terminal. Chip 101 may be an EMV chip.

Chip 101 may store a copy of information printed on a face of smart card 100. For example, chip 101 may store PAN 109, user name 115, expiration date 113 and issuing bank 111. Chip 101 may also store encrypted security information. The encrypted security information may be utilized to provide a "second factor" method of authentication prior to triggering execution of transaction instructions.

For example, smart card 100 may package information entered by user 115 via keypad 105 into transaction instructions. The transaction instructions may include a PIN associated with smart card 100. The staged transaction instructions may be submitted for execution to a transaction gateway without requiring any further input from user 115. The transaction instructions may be transferred to the transaction gateway using wireless circuitry 103. In some embodiments, the transaction instructions may be transferred via wired communication with chip 101.

After a transaction gateway receives transaction instructions formulated by smart card 100, the transaction gateway may first verify that the PIN included in the transaction instructions is associated with smart card 100. For example, the transaction gateway may communicate with a remote payment processing server operated by the issuer and determine whether the received PIN is associated with user name 115 and/or PAN 109.

As a second factor method of authentication, the transaction gateway may determine whether the PIN included in the transaction instructions successfully unlocks encrypted security information stored on chip 101. If the PIN successfully unlocks the encrypted security information, the transaction gateway may execute the received transaction instructions.

Smart card 100 may be any suitable size. FIG. 1 shows that smart card 100 has width w and length l. For example, width w may be 53.98 millimeters ("mm"). Length l may be 85.60 mm. Smart card 100 has thickness t. An illustrative thickness t may be 0.8 mm. An exemplary form factor of smart card 100 may be 53.98 mm×85.60 mm×0.8 mm. Such an exemplary form factor may allow smart card 100 to conveniently fit into a user's wallet or pocket. This exemplary form factor may allow smart card 100 to fit into a card reader of an ATM or POS terminal.

Figure 2:
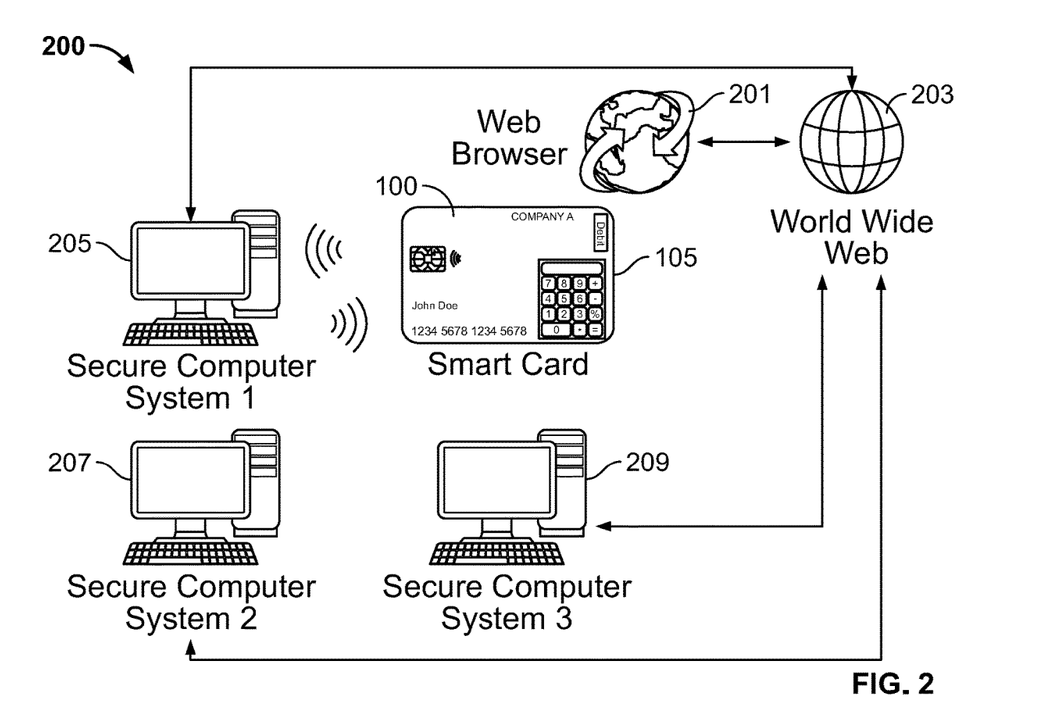
FIG. 2 shows an illustrative apparatus and process in accordance with principles of the disclosure.

FIG. 2 shows illustrative scenario 200. Scenario 200 shows web browser 201. Web browser 201 is in electronic communication with world wide web or internet 203. Via world wide web 203, a vendor may present products or services to a user of smart card 100. Using a web browser 201, the user may identify vendor products or services desired for purchase.

Using web browser 201, the vendor, in addition to presenting information about products or services offered for sale, may present a unique code alongside the products or services. If the user desires to purchase a displayed product or service, the user may enter the unique code into smart card 100 using keypad 105.

Smart card 100 may formulate transaction instructions based on the entered unique code. Smart card 100 may initiate secure communication with secure computer system 205. Secure computer system 205 may be a transaction gateway. Secure computer system 205 may provide a secure communication channel for securely interacting with other systems connected to world wide web 203.

Smart card 100 may transmit transaction instructions to secure computer system 205. Secure computer system 205 may process the transaction instructions received from smart card 100. The transaction instructions may trigger execution of a purchase of a product or service displayed using web browser 201. The transaction instructions may incorporate information included in a unique code presented by the vendor via web browser 201.

Scenario 200 also shows that smart card 100 supports secure communication with secure computer systems 207 and 209. Secure computer systems 207 and 209 may be transaction gateways associated with other vendors. A different unique code presented by another vendor using web browser 201 may configure smart card 100 to connect to one of secure computer systems 207 or 209. A location of smart card 100 may also determine whether smart card 100 connects to secure computer system 205, 207 or 209.

Figure 3:
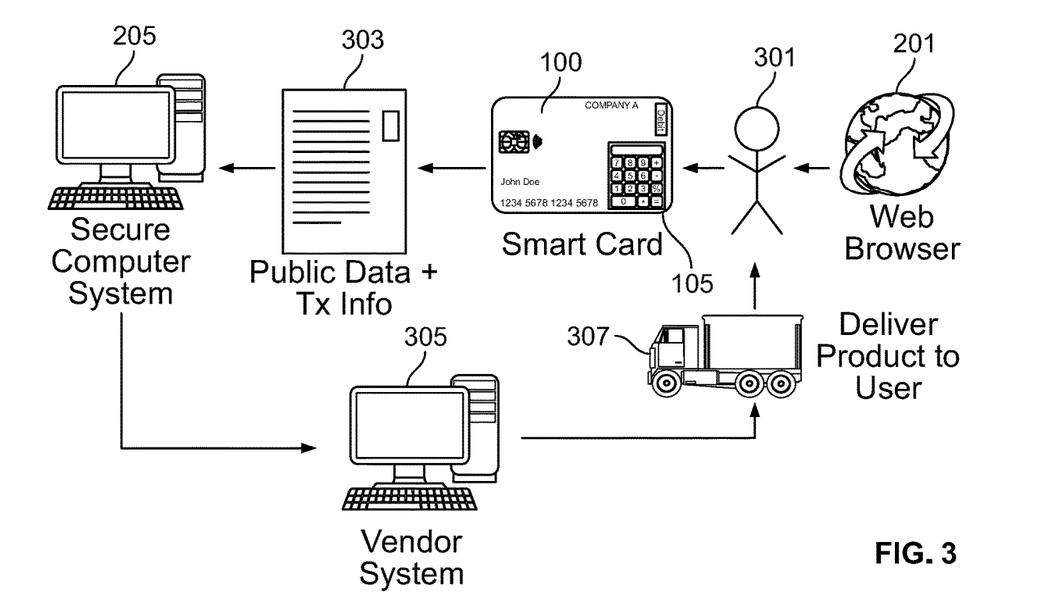
FIG. 3 shows illustrative apparatus and scenario in accordance with principles of the disclosure.

FIG. 3 shows illustrative scenario 300. Scenario 300 shows user 301 acting as an intermediary between web browser 201 and smart card 100. Smart card 100 is insulated from interacting directly with web browser 201 (and associated world wide web 203, shown in FIG. 2). User 301 may view information displayed on web browser 201. Such information may include a unique code displayed by a vendor in connection with a presented product or service. User 301 may enter the displayed unique code into smart card 100 using keypad 105.

Smart card 100 may then formulate transaction instructions that include sensitive transaction information stored on smart card 100. Smart card 100 may integrate public information included in the unique code into the formulated transaction instructions 303.

In some embodiments, the smart card 100 may transmit only sensitive transaction information stored locally on smart card 100 to a transaction gateway. In some embodiments, smart card 100 may transmit sensitive transaction information to a first transaction gateway and transmit transaction instructions to a second transaction gateway.

Smart card 100 may bypass communication with web browser 201 and initiate a direct and secure connection with secure computer system 205. Smart card 100 may transmit the formulated transaction instructions 303 to secure computer system 205. Secure computer system 205, upon receipt of the transaction instructions 303 may initiate a process of debiting funds from an account of user 301. Secure computer system 205, upon receipt of the transaction instructions 303 may initiate a process of crediting funds (debited from of user 301) to an account associated with the vendor offering the product or service presented by web browser 201 for sale to user 301.

Scenario 300 shows that secure computer system 205 may communicate with vendor system 305. For example, secure computer system 205 may provide verification to vendor system 305 that an account of user 301 has been successfully debited for a product identified in a unique code presented via web browser 201 and entered into smart card 100 using keypad 105. In response to receiving such confirmation from secure computer system 205, a vendor may initiate shipment 307 of the desired product to user 301. Thus, user 301 may obtain a desired product or service without entering any sensitive transaction information into web browser 201.

Figure 4:
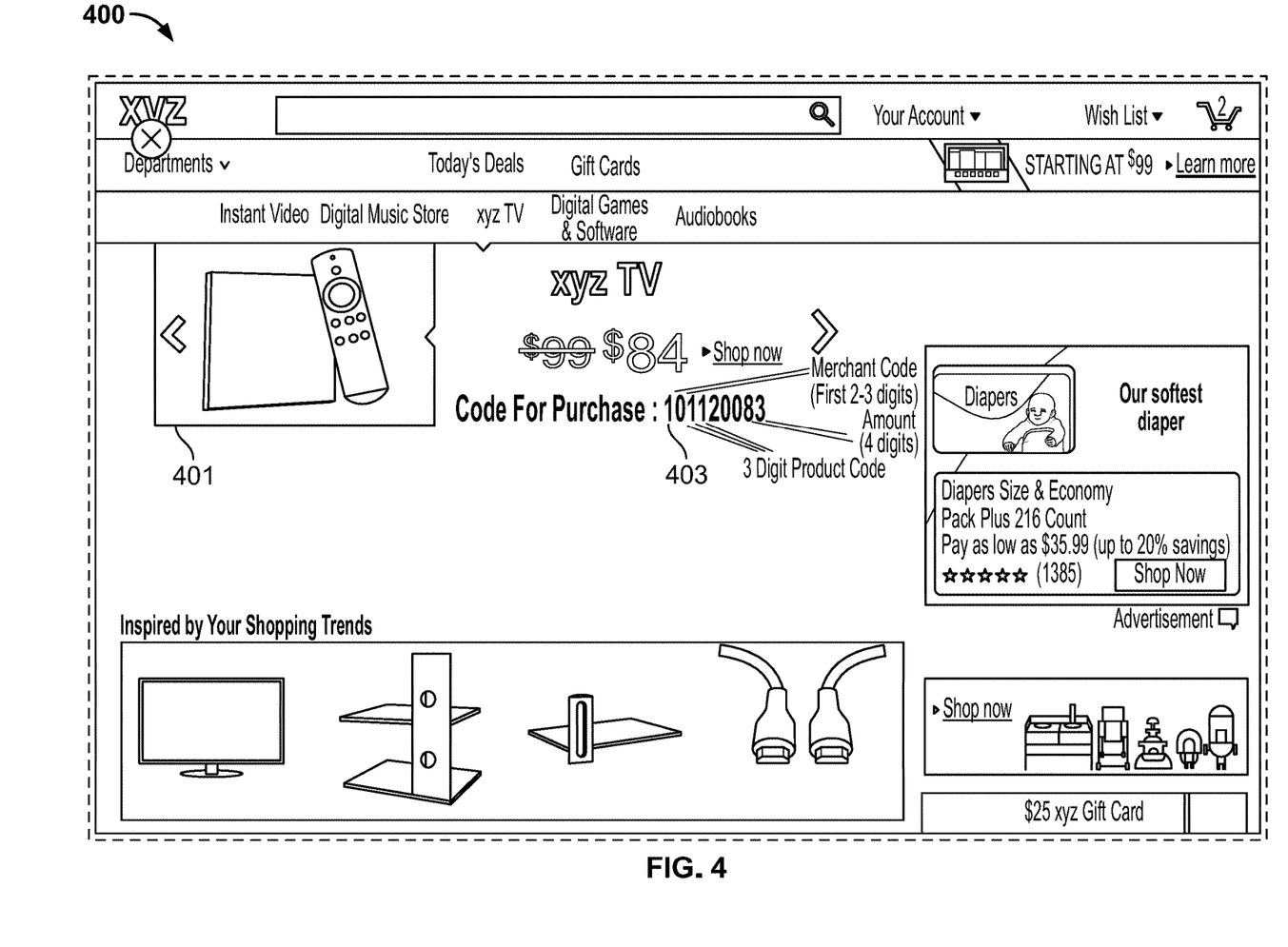
FIG. 4 shows an illustrative application in accordance with principles of the disclosure.

FIG. 4 shows illustrative screen shot 400 that may be displayed by web browser 201. Screen shot 400 shows illustrative details about vendor product 401. Screen shot 400 shows illustrative unique code 403 associated with vendor product 401. User 301 may enter unique code 403 into smart card 100 using keypad 105. Smart card 100 may formulate transaction instructions for purchasing vendor product 401 based on unique code 403. Smart card 100 may trigger a purchase of vendor product 401 by transmitting the transaction instructions to a transaction gateway.

Screen shot 400 shows that unique code 403 is a 10-digit unique code. The first three digits may identify a vendor selling product 401. The next three digits may identify product 401 being sold. The final four digits may represent the cost or price of product 401. Smart card 100 may integrate the information included in unique code 403 into formulated transaction instructions.

Figure 5:
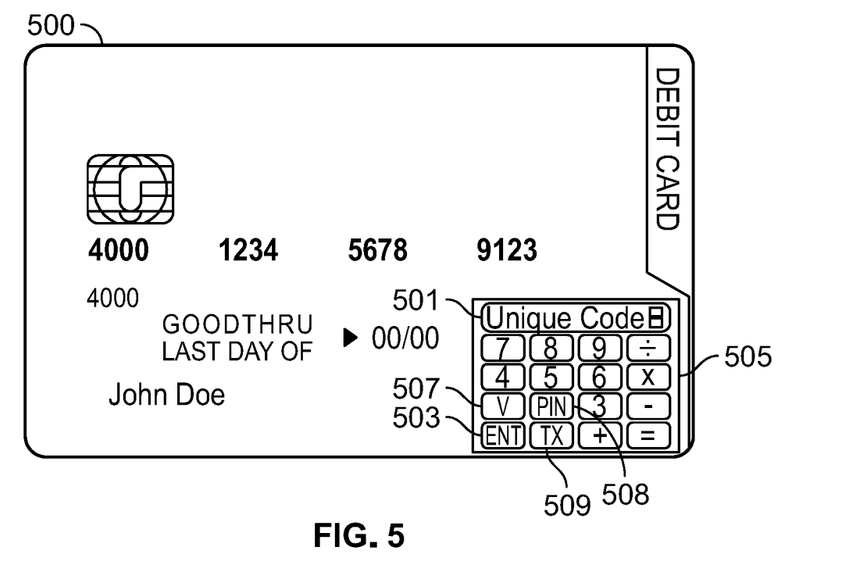
FIG. 5 shows an illustrative apparatus in accordance with principles of the disclosure.

FIG. 5A shows illustrative smart card 500. Smart card 500 may include one or more features of smart card 100 (shown in FIG. 1). Smart card 500 includes keypad 505. Keypad 505 may include one or more features of keypad 105. Keypad 505 includes screen 501 for displaying information entered by a user, such as user 301. Screen 501 may provide a user with visual prompts for entering information. For example, screen 501 may prompt a user to enter a PIN associated with smart card 500 to authorize transmission of transaction instructions to a transaction gateway. FIG. 5A shows screen 501 prompting for entry of a unique code.

Keypad 505 shows illustrative keys that may be used to enter information. Keypad 505 includes enter key 503. A smart card user may press enter key 503 after entering a complete unique code, such as 10-digit unique code 403. Pressing enter key 503 may trigger storage of unique code 403 locally on smart card 500. Depressing enter key 503 may trigger formulation of transaction instructions based on unique code 403.

Keypad 505 includes transaction key 509. The smart card user may press transaction key 509 to initiate a transaction based on an entered unique code. Pressing transaction key 509 may activate a NIC of smart card 500. Once activated, the NIC may scan for an available secure communication channel.

In some embodiments, an initial pressing of transaction key 509 may cause screen 501 to display a list of previously entered unique codes entered by the user. The user may scroll though the previously entered unique codes. The user may scroll through displayed entries using the "+" or "−" keys. The user may press enter key 503 to select an entry.

In some embodiments, smart card 500 may identify a vendor or product associated with each the selected unique code. In response to pressing transaction key 509, the screen may display a list of vendors and/or products associated with a selected entry.

Screen 501 of smart card 100 may display the unique code selected or entered by user 301. User 301 may confirm the entry by pressing the enter button. After selecting the desired entry, the user may press transaction key 509 a second time to initiate transmission of the transaction instructions formulated based on the selected unique code to a transaction gateway. When the transaction gateway receives the transaction instructions, the transaction gateway may initiate the transaction defined in the transaction instructions.

Before pressing transaction key 509 (e.g., a second time) to transmit the transaction instructions, user may first press voice confirmation key 507. Pressing voice confirmation key 507 may cause smart card 500 to generate an audio message. The audio message may confirm the vendor, product and amount included in an entered unique code. If the audio message is correct, the user may proceed to press transaction key 509 and transmit the transaction instructions to a transaction gateway.

In some embodiments, smart card 500 may be configured to automatically produce a confirmatory audio message. In such embodiments, the user may be required to confirm the content of the audio message before smart card 500 transmits the transaction instructions. For example, the user may be required to press enter key 503 or voice confirmation key 507 to confirm the content of the audio message. Smart card 500 may prevent transmission of the transaction instructions (even if the user presses transaction key 509) unless the audio message has been confirmed by the user.

In response to a prompt displayed on screen 501, a user may enter a PIN. The user may confirm submission of the PIN by pressing PIN key 508. The user may be promoted to enter a PIN to confirm that that the user is authorized to initiate a transaction using smart card 500. A microprocessor may toggle wireless interface of smart card 500 from the inactive state to the active state in response to receiving a valid PIN entered using the keypad.

Figure 6:
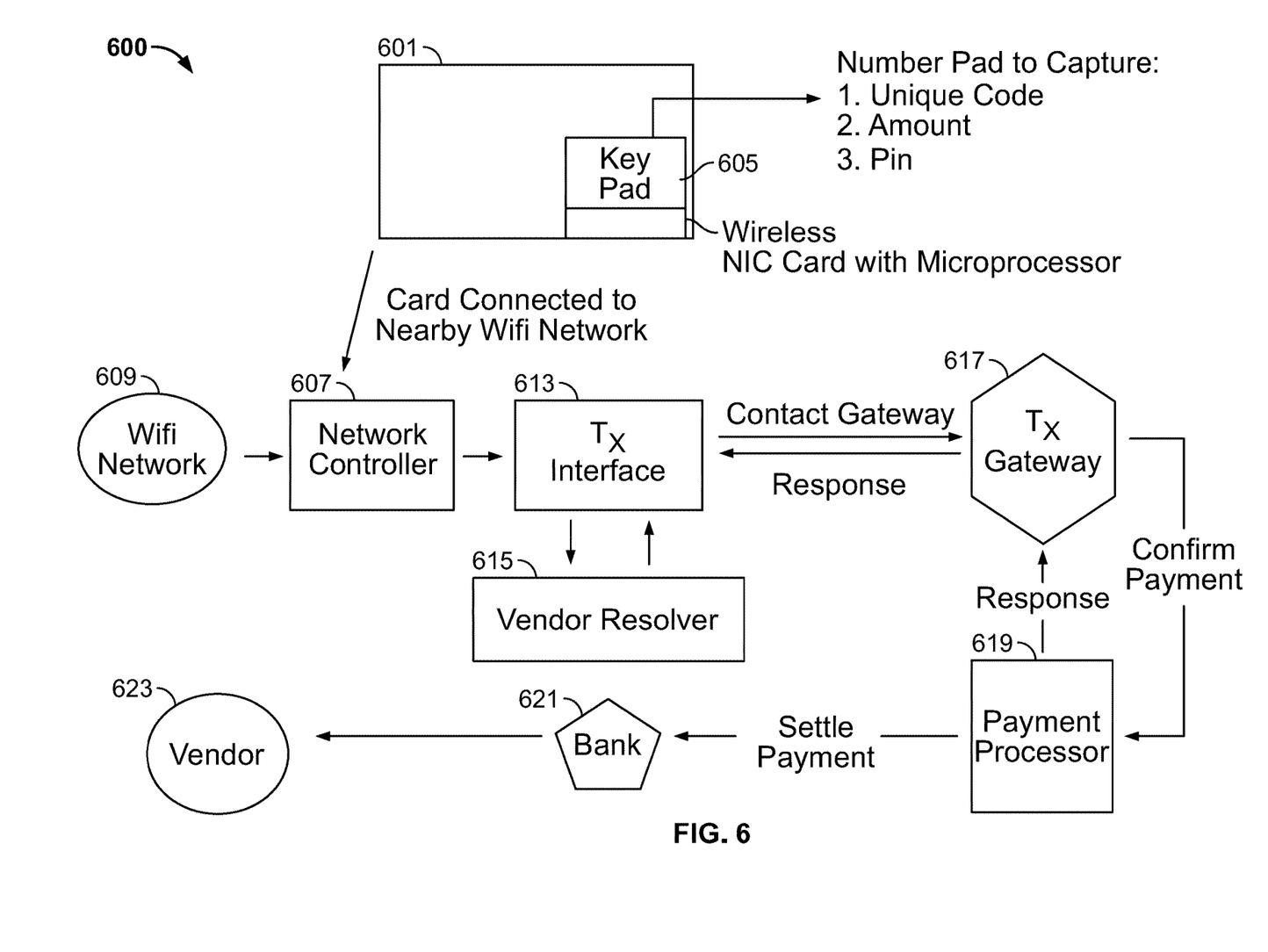
FIG. 6 shows an illustrative apparatus and process in accordance with principles of the disclosure.

FIG. 6 shows illustrative system architecture 600. System architecture 600 includes smart card 601. Smart card 601 may include one or more features of smart card 100 and/or smart card 500. Smart card 601 includes keypad 605, which may include one or more features of keypads 105 and/or 505.

FIG. 6 shows an exploded view of smart card 601 components NIC 607 and transaction interface 613. NIC 607 may include its own dedicated microprocessor and memory. NIC 607 may be a microelectromechanical device that fits within the small form factor associated with smart card 601. In other embodiments, smart card 601 may include another microprocessor for performing other functions. NIC 607 may prepare data generated by a microprocessor on smart card 601 for transmission to a transaction gateway or other secure computer system.

FIG. 6 shows that smart card 601 connects to Wi-Fi network 609 using NIC 607. NIC 607 is also utilized for electronic communication with transaction interface 613. Transaction interface 613 may interact with vendor resolver 615 to identify or resolve a vendor associated with a unique code captured by smart card 601. Based on the vendor identified by vendor resolver 615, smart card 601 establishes a secure communication channel with transaction gateway 617. Components 605, 607, 613 and 615 are all resident on smart card 601.

A network address associated with transaction gateway 617 may be identified based on a vendor identified by vendor resolver 615 and transaction interface 613. A network address associated with transaction gateway 617 may be identified based on a purchase price included in the unique code captured by smart card 601. Transactions of different tier purchase amounts may be routed to different transaction gateways. In other embodiments, the network address of a transaction gateway may be hardwired into NIC 607.

Transaction gateway 617 may determine whether smart card 601 is associated with sufficient funds to process received transaction instructions. Transaction gateway 617 may perform one or more checks to verify transaction instructions received from smart card 601. For example, transaction gateway 617 may prompt a user of smart card 601 to enter a PIN into keypad 605.

After authenticating transaction instructions received from smart card 601, transaction gateway 617 submits the transaction instructions to payment processor 619 for settlement. Payment processor 619 may ensure that funds corresponding to a purchase price identified in the unique code are debited from an account associated with smart card 601. Payment processor 619 may ensure that funds corresponding to the purchase price identified in the unique code are credited to an account associated with vendor 623. Bank 621 may facilitate settlement of funds among vendor 623 and accounts associated with smart card 601. Bank 621 may be an issuer of smart card 601. Bank 621 may be an acquirer associated with vendor 623.

Figure 7:
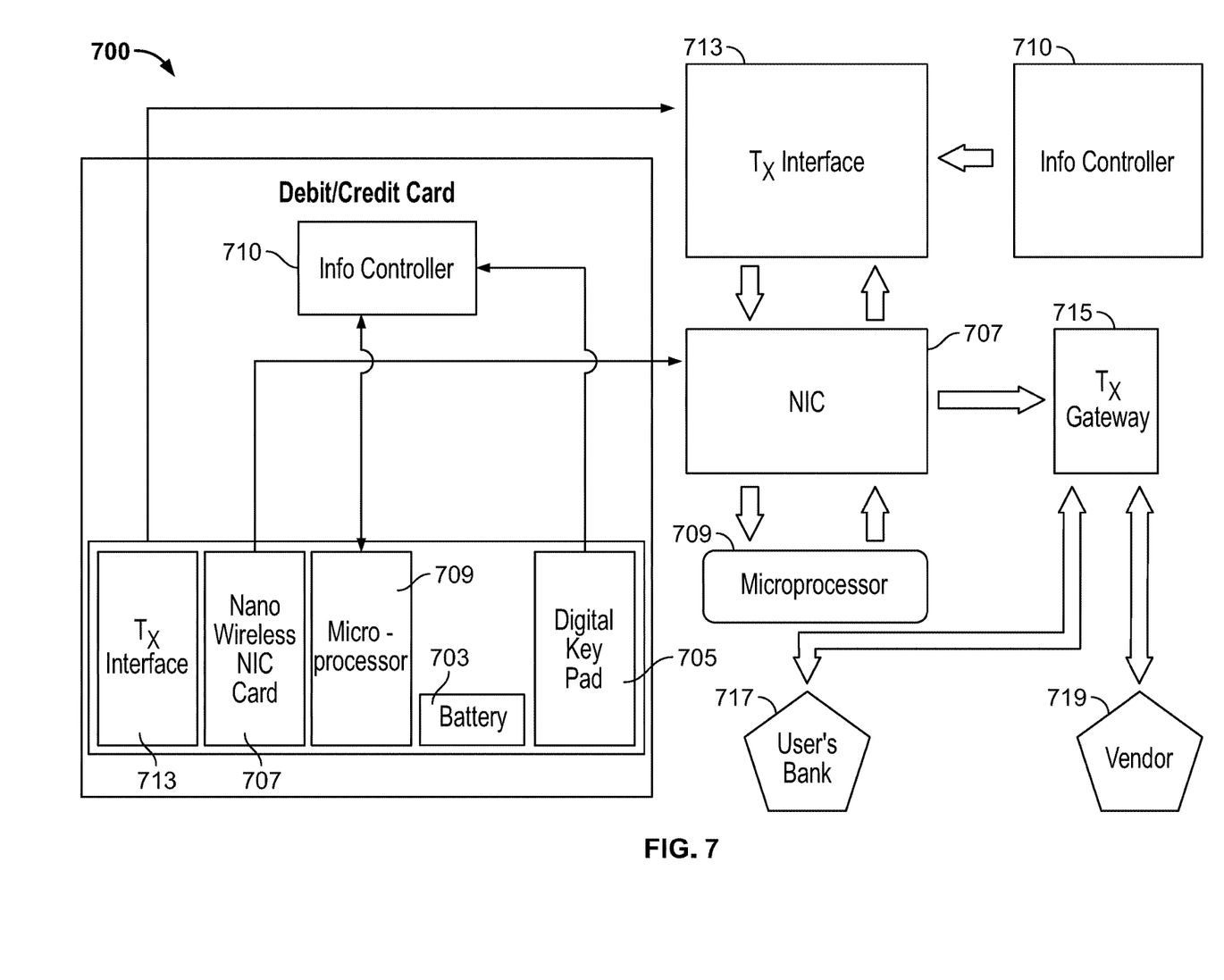
FIG. 7 shows an illustrative apparatus and process in accordance with principles of the disclosure.

FIG. 7 shows illustrative system components of smart card 700. Smart card 700 may include one or more features of smart cards 100, 500 or 601. Smart card 700 includes information controller 710. Information controller 710 may capture data entered using the keypad 705. Information controller 710 may encrypt data captured by keypad 705. Illustrative encryption algorithms include RSA cryptography, Blowfish, AES, RC4, RC5, and RC6. Input controller 710 may store captured data locally on smart card 700.

Smart card 700 includes microprocessor 709 which controls overall operation of smart card 700 and its associated components. For example, microprocessor may control operation of NIC 707 and communication with transaction gateway 715.

Microprocessor 709 may formulate transaction instructions destined for vendor system 719. Such transaction instructions may be forwarded to vendor system 719 by transaction gateway 715. In some embodiments, smart card 700 may be configured to directly communicate with vendor system 719. For example, after a successful execution of transaction instructions by transaction gateway 715, smart card 700 may receive confirmation from vendor system 719.

Microprocessor 709 may formulate transaction instructions destined for user's bank 717. Such transaction instructions may be forwarded to user's bank 717 by transaction gateway 715. In some embodiments, smart card 700 may be configured to directly communicate with user's bank 717. For example, user's bank 717 may request authentication, such as a PIN, before debiting an account associated with smart card 700 based on received transaction instructions.

Thus, methods and apparatus for ONLINE INTERACTION SECURITY TECHNOLOGY are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for securing transmission of sensitive transaction information during an online transaction to purchase a product displayed on a publicly accessible web site, the system comprising a smart card having a thickness not greater than 0.8 millimeters ("mm") and a surface area not greater than 86 mm×54 mm and comprising:
   a wireless communication interface;
   a microprocessor;
   a mechanical keypad; and
   executable instructions stored in a non-transitory memory, that when run by the microprocessor:
      receives a product code displayed by the publicly accessible website and entered into the smart card using the mechanical keypad;
      based on the product code, formulates encrypted transaction instructions to purchase the product;
      establishes a secure communication link with a transaction gateway using the wireless interface;
      authenticates the smart card over the secure communication channel to the transaction gateway; and
      transmits the encrypted transaction instructions and sensitive transaction information to the transaction gateway and processes the purchase of the product corresponding to the product code without interacting with the publicly accessible website and thereby preventing exposure of the sensitive transaction information to the unsecure computer system.

2. The system of claim 1, the smart card further comprising a voice controller that generates an audio message confirming the encrypted transaction instructions generated by the microprocessor;
   wherein the microprocessor does not transmit the encrypted transaction instructions to the transaction gateway until receiving an authorization keystroke entered using the keypad.

3. The system of claim 2, wherein the audio message specifies the authorization keystroke.

4. The system of claim 1, the smart card further comprising a transaction interface that is configured to determine a network address of the transaction gateway based on the product code displayed by the publicly accessible website.

5. The system of claim 4, wherein the product code comprises a 10-digit code, three digits corresponding to a vendor code, three digits corresponding to a product code and four digits corresponding to a cost associated with the product code.

6. The system of claim 5, wherein the network address is determined based on the vendor code.

7. The system of claim 5, wherein the 10-digit code is generated by an unsecure computer system and displayed using a web browser.

8. A method of securing sensitive transaction information stored on a smart card when purchasing a product displayed on a publicly accessible website, the method comprising:
   using a keypad of the smart card, entering a product code displayed by the publicly accessible website and generated by an unsecure vendor system;
   generating transaction instructions that integrate the sensitive transaction information stored on the smart card and the product code provided by the unsecure vendor system;
   based on the product code, determining a network address of a secure transaction gateway;
   using a wireless interface of the smart card establishing a secure communication channel with the secure transaction gateway and bypassing the publicly accessible website; and
   transmitting the transaction instructions to the secure transaction gateway using the secure communication channel;
wherein the secure transaction gateway provides a secure interface for insulating the sensitive transaction information stored on the smart card from being exposed by direct interaction with the publicly accessible website and unsecure vendor system.

9. The method of claim 8, further comprising using a transaction interface on the smart card, resolving the product code to a secure vendor system.

10. A smart card that improves security of sensitive transaction information when making an online purchase of a product displayed by a publicly accessible website, the smart card comprising:
- a housing;
- a wireless interface embedded in the housing;
- a microprocessor embedded in the housing;
- a battery for powering the wireless interface and the microprocessor;
- a mechanical keypad mounted on an outside of the housing; and
- executable instructions stored in a non-transitory memory, that when run by the microprocessor:
  - via the keypad, capture a non-sensitive product code displayed by the publicly accessible website;
  - formulate a set of sensitive transaction instructions based on the captured the non-sensitive product code;
  - using the wireless interface, establish a direct communication channel with a secure transaction gateway identified in the sensitive transaction instructions; and
  - transmit the sensitive transaction instructions directly to the secure transaction gateway for processing on behalf of the unsecure computer system without submitting the set of sensitive transaction instructions to the publicly accessible website.

11. The smart card of claim 10, the executable instructions stored in the non-transitory memory, when run by the microprocessor receive confirmation from the secure transaction gateway via the wireless interface that the transaction instructions generated by the smart card have been successfully executed.

12. The smart card of claim 10, the executable instructions stored in the non-transitory memory, when run by the microprocessor receive confirmation directly from an unsecure computer system via the wireless interface that the transaction instructions generated by the smart card have been successfully executed.

13. The smart card of claim 10, the data entered using the keypad and displayed by the publicly accessible website comprises:
- a vendor code;
- a product code; and
- a transaction amount.

14. The smart card of claim 13 the executable instructions stored in the non-transitory memory, when run by the microprocessor identify the secure transaction gateway based on the vendor code.

15. The smart card of claim 14, wherein the vendor code is a first vendor code and the secure transaction gateway is a first secure transaction gateway, the smart card further comprising a transaction interface that is configured to:
- resolve the first vendor code to the first secure transaction gateway; and
- resolve a second vendor code to a second secure transaction gateway.

16. The smart card of claim 10 the executable instructions stored in the non-transitory memory, when run by the microprocessor encrypts the sensitive transaction instructions such that the sensitive transaction instructions are decryptable by the secure transaction gateway and not by an unsecure computer system hosting the publicly accessible website.

17. The smart card of claim 10 further comprising a biometric reader and the executable instructions stored in the non-transitory memory, when run by the microprocessor require a capturing, using the biometric reader, a valid biometric feature before submitting the sensitive transaction instructions to the secure transaction gateway.

18. The smart card of claim 10, wherein the housing and the keypad collectively have a thickness that is not greater than 0.8 millimeters ("mm").

19. The smart card of claim 10, further comprising at least one electrical contact accessible through the housing, and the battery is recharged via the at least one electrical contact when the smart card is inserted into a card reader.

20. The smart card of claim 10, wherein:
- the wireless interface comprises:
  - an inactive state in which the wireless interface is unable to transmit data; and
  - an active state in which the wireless interface is capable of transmitting data; and
- the microprocessor toggles the wireless interface from the inactive state to the active state in response to receiving a valid personal identification number ("PIN") entered using the keypad.

* * * * *